United States Patent [19]

Doering et al.

[11] Patent Number: 4,893,120
[45] Date of Patent: Jan. 9, 1990

[54] TOUCH PANEL USING MODULATED LIGHT

[75] Inventors: Roger W. Doering, Hayward; Colin F. McManus, Danville, both of Calif.

[73] Assignee: Digital Electronics Corporation, Hayward, Calif.

[21] Appl. No.: 274,708

[22] Filed: Nov. 18, 1988

Related U.S. Application Data

[63] Continuation of Ser. No. 935,471, Nov. 26, 1986, abandoned.

[51] Int. Cl.⁴ ............................................. G01V 9/04
[52] U.S. Cl. ..................................... 341/31; 250/221; 178/170; 340/712
[58] Field of Search .................... 340/706, 707, 365 P, 340/712; 250/221, 214 B, 214 C; 178/18, 17 D; 341/26, 31, 5; 73/DIG. 11

[56] References Cited

U.S. PATENT DOCUMENTS

| | | | |
|---|---|---|---|
| 3,370,284 | 2/1968 | Bagno | 340/511 |
| 3,769,515 | 10/1973 | Clark | 340/365 P |
| 3,775,560 | 11/1973 | Ebeling et al. | 178/18 |
| 3,860,754 | 1/1975 | Johnson et al. | 340/365 P |
| 3,937,952 | 2/1976 | Ripley et al. | 340/365 P |
| 3,970,846 | 7/1976 | Schofield et al. | 250/221 |
| 4,207,466 | 6/1980 | Drage et al. | 250/221 |
| 4,243,879 | 1/1981 | Carroll et al. | 250/221 |
| 4,247,767 | 1/1981 | O'Brien et al. | 340/365 P |
| 4,267,443 | 5/1981 | Carroll et al. | 250/221 |
| 4,384,201 | 5/1983 | Carroll et al. | 250/221 |
| 4,591,710 | 5/1986 | Komodina et al. | 250/221 |

Primary Examiner—Alvin Oberley
Attorney, Agent, or Firm—Flehr, Hohbach, Test, Albritton & Herbert

[57] ABSTRACT

A touch panel system using modulated light beams to enable the system to detect when one or more of the light beams are blocked even in bright ambient light conditions. The system has a "touch sensitive" display surface with a defined perimeter. Surrounding the display surface are a multiplicity of light emitting elements and light receiving elements. These elements are located so that the light paths defined by selected pairs of light emitting and light receiving elements cross the display surface and define a grid of intersecting light paths. A scanning circuit sequentially enables selected pairs of the light emitting and light receiving elements, modulating the amplitude of the light emitted in accordance with a predetermined pattern. A filter generates a blocked path signal if the currently enabled light receiving element is not generating an output signal modulated in accordance with the predetermined pattern. Finally a computer is used to determine if an object is adjacent to the display surface and the location of the object, by determining if the filter is generating at least two blocked path signals corresponding to light paths which intersect each other within the perimeter of the display surface. A failure detection circuit for testing the LEDs and phototransistors, by checking for blocked LED/phototransistor pairs. When a blocked pair is found the phototransistor of the blocked pair is paired with an LED near the blocked LED and the block LED is paired with a photo-transistor near the blocked LED to determine if they have failed.

9 Claims, 3 Drawing Sheets

TOUCH PANEL USING MODULATED LIGHT

This is a continuation of application Ser. No. 935,471 filed Nov. 26, 1986, now abandoned.

The present invention relates generally to touch sensitive screens, displays and panels, and particularly to a touch panel apparatus and method which is operable even in strong ambient light conditions.

BACKGROUND OF THE INVENTION

Touch sensitive panels and screens are commonly used in many types of computerized equipment. In some systems, a touch screen avoids the need for providing a keyboard.

Referring to FIG. 1, a touch screen is typically used to allow the user to easily select one of a plurality of displayed items. The user makes his or her selection by touching the portion of the screen associated with the item to be selected. To clarify the boundaries of the areas associated with each item, the image on the screen may include boxes surrounding the displayed items.

The uses of touch screens have grown increasingly sophisticated, allowing the user to draw pictures, manipulate menus, use a displayed keyboard for alphanumeric input, and so on.

The terms "screen", "display", and "panel" are used synonymously herein. The present invention concerns the touch aspect of touch screens. Therefore, for this purpose it is unimportant how the image on the touch sensitive apparatus is displayed. The touch mechanism could even be used with a static image instead of with a display device.

In most cases, the term "touch sensitive" is a misnomer. Most touch sensitive screens, including the present invention, sense the interruption of one or more light beams; they do not sense actual physical contact with the screen or panel. The display is surrounded by pairs of light emitting and light sensing elements. These pairs are individually enabled in a preselected pattern, and the position of any object (such as the user's finger) touching the screen is determined by looking at which lights are blocked by the object.

A serious shortcoming in prior art touch screens is that their performance degrades in bright ambient light conditions, especially in sunlight. The source of this problem is as follows. In the prior art touch screens, the light detection system determines that the light traveling between a selected pair of emitting and receiving elements is blocked if the amplitude of the received light is below a threshold value. However, if the ambient light by itself causes the amount of light received by the screen's receiving elements to exceed the threshold value, then the system is unable to detect the presence of an object touching the screen.

In the more sophisticated prior art touch screens, the system compares the signal level output by the light receiving elements in response to ambient light with the signal level output when the light of a selected light emitting element is added to the ambient light. For instance, in U.S. Pat. No. 4,243,879, the disclosed system samples the signal level generated by each receiving element in response to the ambient light just before it turns on the corresponding light emitting element and compares the resulting signal level with sampled level.

This type of "calibrated threshold" prior art system suffers from very poor signal to noise ratios. In bright ambient light conditions the signal level attributable to the light emitting element will be very small, and therefore the incremental threshold for determining that light from the light emitting element is not blocked must be very low. However, the lower the threshold, the greater the chance that small ambient light fluctuations will drown out the signal from the light emitting element.

If a "calibrated threshold" system uses an ADC (analog to digital converter) to quantify the intensity of the light being received, when the system is in very bright ambient light (e.g., direct sunlight) the quantified ambient light level will be so large that the ADC will not be able to distinguish between ambient light and the light from unblocked light beams.

Also, the intensity of the light emitted by LEDs typically varies, from component to component, by a factor of up to ten to one. Also, the sensitivity of light receiving elements, which are usually phototransistors, vary even more than ten to one. In other words, the signal level generated by any two supposedly identical phototransistors, in response to the same light intensity level, can vary be even more than ten to one. While the problem of nonuniform components can be at least partially solved by sorting components, these variations generally force the prior art touch screens to use a fairly low incremental threshold for detecting unblocked light beams—which decreases the signal to noise ratio of those system. As a result, these touch screens often malfunction in bright ambient light conditions.

After studying these problems and the prior art solutions, the inventor of the present invention concluded that the use of a threshold intensity level is inherently problematic. Therefore the present invention uses a different concept.

In particular, the present invention modulates the light transmitted by the touch screen's LEDs, and then detects whether the light received by the screen's phototransistors includes a signal component that is modulated in the same way. If so, the light path is unblocked, otherwise the system concludes that light path is blocked. The inventor has found that this system works in all ambient light conditions, including bright, direct sunlight.

It is therefore a primary object of the present invention to provide a touch screen apparatus using modulated light that is operable even in strong ambient light conditions.

SUMMARY OF THE INVENTION

In summary, the present invention is a touch panel system which uses modulated light beams to enable the system to detect when one or more of the light beams are blocked even in bright ambient light conditions.

The system has a "touch sensitive" display surface with a defined perimeter. Surrounding the display surface are a multiplicity of light emitting elements and light receiving elements. These elements are located so that the light paths defined by selected pairs of light emitting and light receiving elements cross the display surface and define a grid of intersecting light paths. A scanning circuit sequentially enables selected pairs of the light emitting and light receiving elements, modulating the amplitude of the light emitted in accordance with a predetermined pattern. A filter generates a blocked path signal if the currently enabled light receiving element is not generating an output signal modulated in accordance with the predetermined pattern. Finally a computer is used to determine if an object is adjacent to the display surface and the location of the object, by determining if the filter is generating at least two blocked path signals corresponding to light paths which intersect each other within the perimeter of the display surface.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
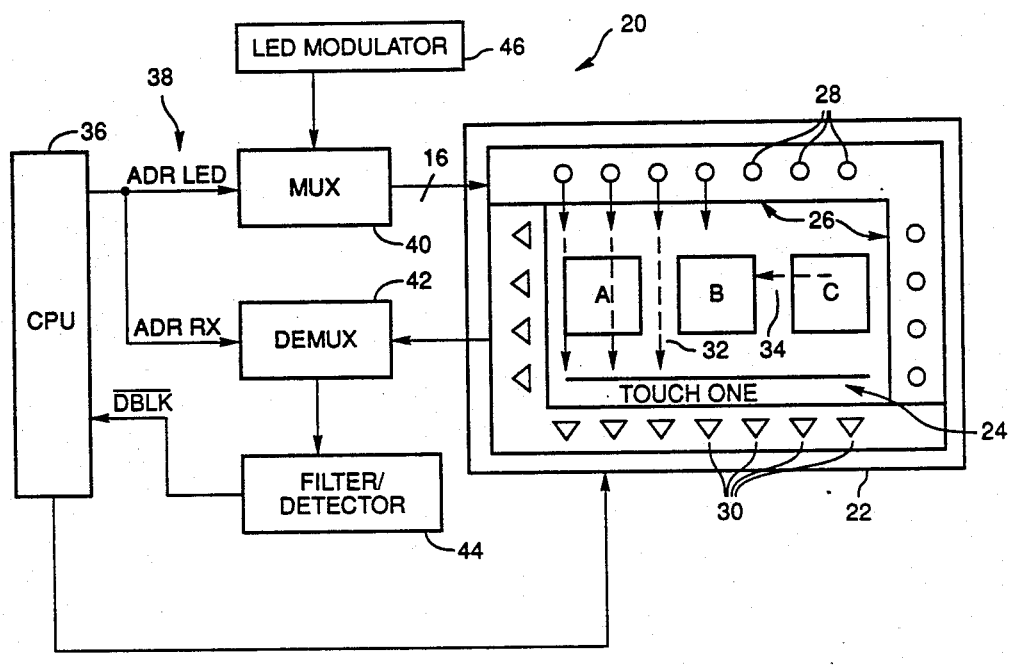
FIG. 1 is a block diagram of a touch screen system in accordance with the present invention.

Referring to FIG. 1, there is shown a touch screen display system 20 having a display 22 which is "touch sensitive". The display 22 has a display surface 24 with a defined perimeter.

Surrounding the display surface 24 are a multiplicity of light emitting elements (LEDs) 28 and light receiving elements (phototransistors) 30. These LED and phototransistor elements are located so that the light paths 32 and 34 defined by selected pairs of LEDs and phototransistors cross the display surface 24 and define a grid of intersecting light paths. For a rectangular display such as the one shown in FIG. 1, each LED 28 is matched by or paired with a phototransistor horizontally or vertically across the display surface.

The light emitting elements used in touch screens are typically infrared LEDs (light emitting diodes), although other light frequencies and components could be used.

A computer 36, in conjunction with a scanning circuit 38, determines if an object is adjacent to the display surface 24 by sequentially enabling each of the LEDs 28 surrounding the display surface 24 and looking to see if the corresponding phototransistors 30 receive the light transmitted by the LED 28. If the light is received, it can be concluded that no object is blocking the light path defined by the LED 28 and its corresponding phototransistor 30. On the other hand, it can be concluded that an object is blocking the light path if the emitted light is not received.

By sequentially enabling or energizing all of the LEDs and looking at the resulting $\overline{DBlk}$ signal, the computer 36 can determine the location of any object which is adjacent to (i.e., touching or almost touching) the display surface. At the risk of belaboring the obvious, if two or more intersecting light paths are being blocked by an object, the location of the object is the intersection of the blocked vertical and horizontal light paths.

In the preferred embodiment, there are approximately five LEDs and phototransistors per inch around the perimeter 26 of the display surface 24. Most touch screens will use between three and six elements per inch. In the preferred embodiment there are fifty-six LED and phototransistor pairs surrounding the display. The scanning circuit 38 is designed to handle up to sixty-four pairs. Due to the close spacing of elements, it is unusual for only one or more light paths to be blocked without an intersecting light path also being blocked; but if this happens the computer 36 will not be able to locate the object blocking the light beam(s). For instance, a piece of paper could be used to block several vertical light paths without blocking any of the horizontal light paths.

In normal operation, the computer 36 addresses each LED/phototransistor pair with a single six bit address AdrLED. The scanning circuit 38 uses a multiplexer 40 to decode the address AdrLED and thereby energize one of the fifty-six LEDs 28 along the top and right hand side of the display surface 24. A demultiplexer 42 also decodes the address AdrLED and enables just one of the fifty-six phototransistors 30 along the display's perimeter 26 to be coupled to a filter/detector circuit 44.

The filter/detector circuit 44 determines whether the selected phototransistor is receiving light from the selected LED and, if not, generates a blocked path signal $\overline{DBlk}$.

As explained above, to solve the problems associated with using touch screens in bright ambient light conditions, the amplitude of the light emitted by the selected LED is modulated in accordance with a predetermined pattern. In the preferred embodiment, the LED is driven by a sinusoidally varying current generated by an LED modulator circuit 46.

In the preferred embodiment, the LED's amplitude is modulated at a frequency of 60 kilohertz. The inventor has found that modulation frequencies between 10 kilohertz and 500 kilohertz are effective in most ambient light conditions and are therefore preferred. High modulation frequencies are preferred because they permit faster testing for blocked light paths, and therefore faster scanning of the entire display and faster response to actions by the user of the system 20. With currently available low cost phototransistors, the maximum feasible modulation frequency is approximately 1 megahertz.

Phototransistors generate output signals which correspond (and, in fact, are approximately proportional) to the amplitude of the light received by the phototransistor. The filter circuit 44 generates a blocked path signal if the currently enabled phototransistor is not generating an output signal modulated in the same way (i.e., in the preferred embodiment, at the same frequency) that the LED's amplitude is modulated. In other words, as long as a portion of the light received by the phototransistor is modulated at the same frequency as the currently enabled LED, then the system concludes that the currently enabled light path is not blocked.

Figure 2:
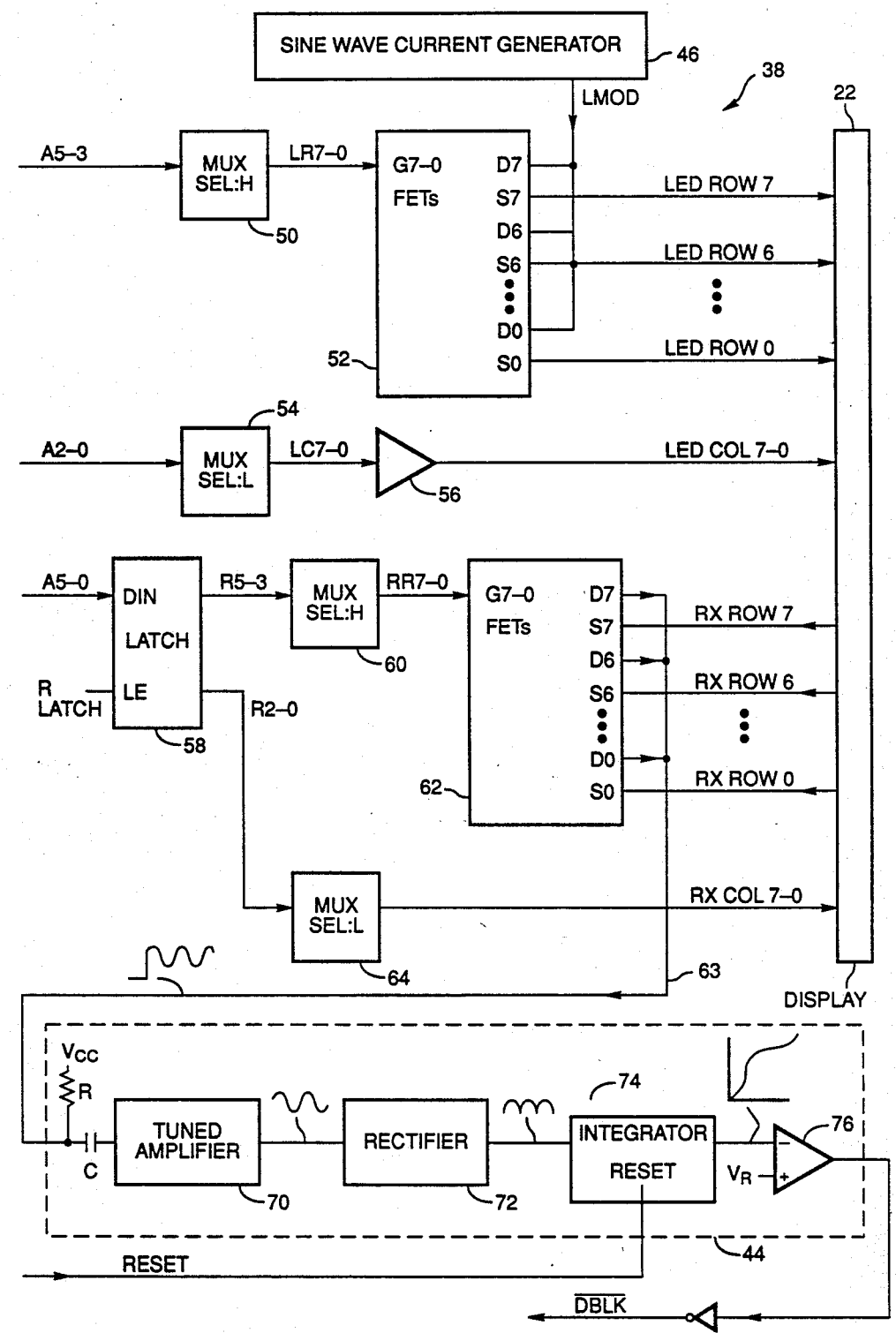
FIG. 2 is a block diagram of the multiplexing and signal modulation circuitry used in the preferred embodiment.

FIG. 2 is a block diagram of the scanning circuit 38 used in the preferred embodiment. The signal lines on the left side of this figure go to the computer 36 shown in FIG. 1. As will be understood by those skilled in the art, the computer 36 is a one chip microcomputer which includes an interface circuit for buffering the flow of signals in and out of the microcomputer.

Address lines A5-A0 from the computer 36 are used to select both the LED and the phototransistor to be energized. As will be discussed below, by using a latch signal, RLatch, the computer can select a phototransistor with an address that is different than the currently selected LED. Normally, though, the selected LED and phototransistor will have the same address.

Since six binary address lines are used, up to 64 separate LED/phototransistor pairs can be addressed.

Figure 3:
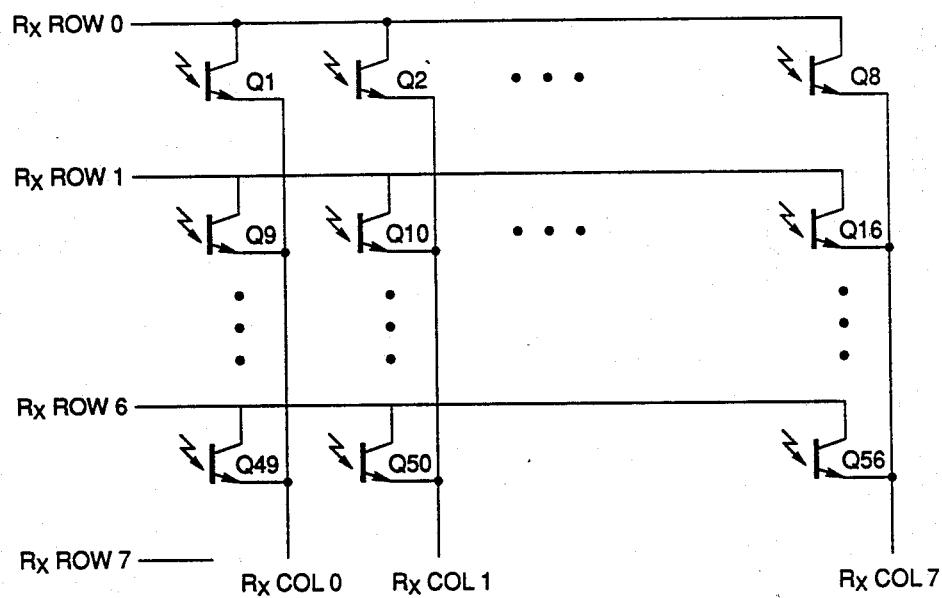
FIG. 3 is a schematic representation of how the LEDs and phototransistors are wired in the preferred embodiment.

As shown in FIG. 3, the phototransistors are wired using a matrix of connectors having up to eight rows and eight columns. In the preferred embodiment shown in FIG. 3, only 56 phototransistors are used and therefore one row connector RxRow7 is not used. The LEDs are wired in a similar fashion using an eight by eight matrix of connectors.

The prior art devices known to the inventor, such as the touch panel disclosed in U.S. Pat. No. 4,243,879, use a separate connector for each light emitting and light receiving element.

By using a matrix of connectors in this fashion, instead of a separate connector for each elements, the number of connectors is substantially reduced (generally, for N elements, from N+1 connectors to $2\sqrt{N}$). This not only simplifies the design of the circuit, it also reduces the size of the printed circuit board needed. In particular, it allows the use of a printed circuit board which is small in width so that the width and length of the display device 22 can be as small as possible for a given display surface. In the preferred embodiment, the width of the border around the display surface 24 is less than one inch (0.375 inches for the printed circuit board, plus approximately 0.45 inches for the LED and phototransistor elements, an optical filter, and the external packaging of the display).

Referring back to FIG. 2, the LED currently selected by the computer is energized as follows. Address lines A5–A3 are decoded by a multiplexer 50 so that only one of the lines LR7–LR0 are pulled high. These lines LR7–LR0 are coupled to the gates of eight FETs (field effect transistors) 52, thereby enabling only one of the FETs. The output of a sine wave current signal generator 46 is coupled to the drains of all eight FETs 52, and the sources of the FETs are coupled to LED drive lines LEDRow7–LEDRow0. Thus, one of the LED drive lines is driven by the sine wave signal from generator 46, and all of the other drive lines are left floating (i.e., isolated by the FETs).

Address lines A2–A0 are decoded by multiplexer 54 which pulls one of the resulting eight lines LC7–LC0 low and leaves the others at a high voltage (i.c., Vcc, which is 5 volts). The current capacity of these lines is amplified by buffer 56, so that one of the lines LEDCo17–LEDCo10 is pulled low and absorbs the current flowing through the selected LED.

The circuit for selecting one phototransistor is similar to the circuit for selecting one LED, except that Latch 58 can latch the address used to select the phototransistor. When the RLatch signal from the computer 36 is high, the Latch 58 is transparent—the address signals flow unimpeded from lines A5–A0 to lines R5–R0. However, when RLatch is low, the present state of the A5–A0 lines is latched and held on lines R5–R0 until RLatch is pulled high.

Multiplexer 60 decodes address lines R5–R3 and pulls one of the eight lines RR7–RR0 high. These lines RR7–RR0 are coupled to the gates of eight FETs (field effect transistors) 62, thereby enabling only one of the FETs. The sources of the FETs are coupled to phototransistor collector lines RxRow7–RxRow0, and drains are all coupled to the input of the filter detector circuit 44. Thus, one of the phototransistor collector lines is coupled to connector line 63, and all of the other drive lines are left floating (i.e., isolated by the FETs).

Address lines R2–R0 are decoded by multiplexer 64 which pulls one of the resulting eight lines RxCo17–RxCo10 low and leaves the others at a high voltage (i.e., Vcc, which is 5 volts). The selected line RxCo17–RxCo10 which is pulled low absorbs the current flowing through the selected phototransistor.

The selected phototransistor gets its current from the power supply node Vcc through a resistor R in the filter 44. This resistor R will typically have a low resistance, typically between 50 and 100 ohms.

Phototransistors draw current corresponding to the amplitude of the light received. Thus if the light received by the selected phototransistor consists of a d.c. component from the ambient light surrounding the display 22 plus a pulsing or modulated light from the LED across the display, the phototransistor's current will have both a d.c. and an a.c. component—as schematically shown above line 63. Further, the a.c. component will vary at the same frequency as the frequency that the incoming light is modulated.

Note that the current source for the phototransistor is given a low resistance so that the phototransistor will draw a readily detectable a.c. current even in bright ambient light conditions.

The resulting voltage on line 63 is sensed and analyzed by the filter circuit 44. The signal on line 63 is a.c. coupled through capacitor C to a tuned amplifier 70. Amplifier 70 is a narrow band amplifier which selectively amplified signals at the frequency generated by the sine wave generator 46. Thus, to the extent that the voltage on line 63 varies at 60 kilohertz (the modulation frequency output by generator 46) the tuned amplifier 70 will generate a sinusoidal output signal. If the light from the selected LED is blocked by an object touching the display surface 24, then the output of the amplifier 70 will be a flat grounded signal.

After passing the output of amplifier 70 through a rectifier 72, this signal is integrated by an integrator circuit 74. If the received light includes the light from the enabled LED, the output of the integrator 74 will rise; otherwise it will generate a flat output. Then the output of the integrator is compared by comparitor 76 with a reference signal $V_R$ (having a voltage of approximately one volt in the preferred embodiment) to determine if the received light includes the light from the enabled LED. If so, the output of the comparitor $\overline{DBlk}$ is high; otherwise $\overline{DBlk}$ is low, indicating that the light path defined by the selected LED/phototransistor pair is blocked.

The integrator 74 needs to be reset each time that a new LED/phototransistor pair is enabled. In an alternate embodiment, the integrator 74 could be replaced a low pass filter. The low pass filter would pass a null signal if the output of the tuned amplifier 70 is null, and would pass a positive signal if the tuned amplifier 70 generates a sinusoidal output. The low pass filter has the disadvantage of being somewhat slow, but has the advantage that it need not be reset.

In summary, the computer generates an address A5–A0 and thereby selects one LED and one phototransistor. The scanning circuit decodes the address and enables the selected LED/phototransistor pair. The enabled LED is driven by a current which is modulated at a selected frequency, and therefore the amplitude of light emitted from the selected LED is also modulated at this frequency. A filter circuit 44 analyzes the waveform of the current drawn by the selected phototransistor and generates a blocked path signal DBlk if the waveform does not contain an a.c. component which is modulated in the same way as the amplitude of the light from the selected LED.

Figure 4:
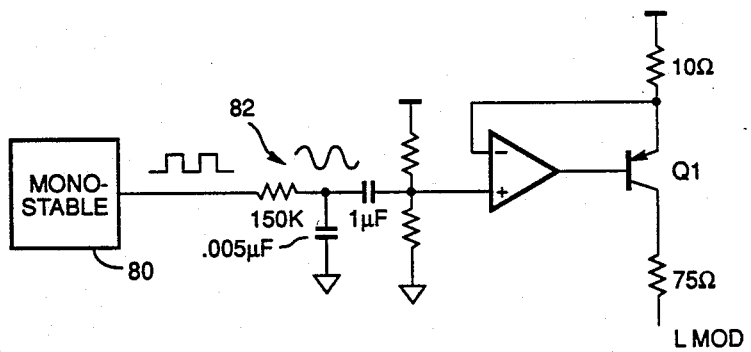
FIG. 4 is a schematic representation of the modulating oscillator used in the preferred embodiment.

FIG. 4 is a schematic representation of the modulating oscillator used in the preferred embodiment. The square wave output of a monostable 80 is shaped by an RC pair 82 and the resulting signal is amplified by a simple current amplifier circuit.

Figure 5:
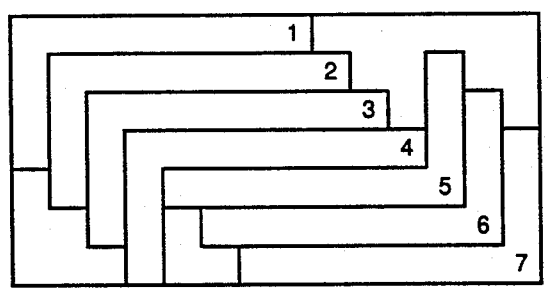
FIG. 5 depicts how the printed circuit boards for the LEDs and phototransistors are made.

FIG. 5 depicts how the printed circuit board for the LED and phototransistors are made. As shown, a number of equal sized L shaped substrates are cut from a single circuit board, which is much more material efficient than cutting out one rim from one circuit board for each display. As shown in FIG. 1, each L shaped board is used to mount either the LEDs or the phototransistors for one display. Further, as noted above, the use of matrix connections allows the L's to be made with a width of just 0.375 inches.

Referring to Table 1, the computer 36 checks for an object touching the display surface 24 by sequentially enabling all of the LED/phototransistor pairs around the display and testing the DBlk signal. If a blocked path is detected, the system checks to make sure that all the blocked paths are contiguous, because if more than one object is touching the screen it will often be impossible to determine the position of both objects. At the end of each complete scan of the screen, the routine generates a report based on the range of horizontal and vertical paths which were found to be blocked so that the computer 36 can use that information to determine what action the user is requesting.

The procedures shown in Tables 1 and 2 are written using a high level "pseudocode" language that can be easily understood by anyone skilled in the art of computer programming.

Referring to Table 2, if the user suspects that the touch screen is not operating properly, the user can run the procedure shown in Table 2 to check for failed components. Similarly, if computer 36 consistently sees that one LED/phototransistor pair appears to be blocked, even when no other pairs are blocked, it can check to see if either the LED or the phototransistor from that pair are malfunctioning. In the preferred embodiment, the computer 36 generates a display which asks the user to make sure that nothing is touching the screen 24, and then it runs the procedure shown in Table 2.

This procedure checks for blocked LED/phototransistor pairs. When a blocked pair is found, the computer then uses the RLatch signal shown in FIG. 2 to pair the selected phototransistor with an LED near the selected LED (i.e., near the ed normally corresponding to the selected phototransistor), and to pair the selected LED with a phototransistor near the selected phototransistor (i.e., the phototransistor normally corresponding to the selected LED). If the system still generates a blocked path signal when the alternate LED is enabled, then the system concludes that selected phototransistor is malfunctioning because it much more likely that one phototransistor isn't working than that two LEDs have failed. Similarly, if the system generates a blocked path signal when the alternate phototransistor is enabled, then the system concludes that the selected LED has failed.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the geometric pattern of light emitting elements and light receiving elements could be changed in numerous ways. In some instances, especially nonrectangular displays, several light receiving elements could be paired with a single light emitting element, or vice versa.

In other embodiments, more complicated methods of modulating the emitted light could be used. For instance, the light could be modulated in a predetermined sequence of pulses, each pulse being further modulated at a predetermined frequency. In another variation the modulation frequency could be automatically changed (e.g., using a tunable monostable or oscillator) if the system detects that the ambient light includes light modulated at the modulation frequency initially used by the system.

TABLE 1

Pseudocode for Normal Touch Detection

— Check each of 43 vertical and 13 horizontal light paths
— Call Touch subroutine if path is blocked (i.e., if $\overline{DBlk}$ is
— low).
— Touch subroutine checks for noncontiguous blocked light
— paths.
LowX = HighX = LowY = HighY = 0
Loop: For K = 1 to 56
Turn on LED(K) and Phototransistor(K)
Read $\overline{DBlk}$
If $\overline{DBlk}$ = 0
Call Touch(K)
Endif
Endloop
Report LowX, HighX, LowY, HighY
Return
Subroutine Touch:
If K < 44                          vertical paths: K = 1 to 43
If LowX = 0                        first blocked column?
LowX = HighX = K
Return
Endif
If HighX = K − 1                   are the blocked columns
HighX = K                          contiguous?
Else
Report Multiple Hit
Endif
Else                               horizontal paths: K > 43
If LowY = 0
LowY = HighY = K
Return
Endif
If HighY = K − 1
HighY = K
Else
Report Multiple Hit
Endif
Endif

TABLE 2

Pseudocode for Detecting Defective LEDs and Phototransistors

Display "Please Make Sure Nothing Is Touching The Display"
Wait X seconds
Loop: For K = 1 to 56
Turn on LED(K) and Phototransistor(K)
Read $\overline{DBlk}$
If $\overline{DBlk}$ = 0
Call Check(K)
Endif
Endloop
Return
Subroutine Check:
Begin Case TABLE 2-continued Pseudocode for Detecting Defective LEDs and Phototransistors

```
Case (K= 1) J=2
Case (K=44) J=45
Otherwise J=K-1
Endcase
Turn on LED(J) and Phototransistor(K)
Read DBIk
If DBIk = 0
Report Bad Phototransistor K
Return
Endif
Turn on LED(K) and Phototransistor(J)
Read DBIk
If DBIk = 0
Report Bad LED K
Return
Endif
```

What is claimed is:

1. A touch panel, comprising:
a display surface having a defined perimeter;
a multiplicity of light emitting elements and light receiving elements; said elements located so that the light paths defined by selected pairs of light emitting and light receiving elements cross said display surface and define a grid of intersecting light paths thereon; said light receiving elements including means for generating an output signal corresponding to the amplitude of the light received thereby;
scanning means for sequentially enabling selected pairs of said light emitting and light receiving elements;
modulation means for modulating the amplitude of the light emitted by the currently enabled light emitting element at a frequency of at least 10 kilohertz in accordance with a predetermined pattern;
filter means for generating a blocked path signal if the currently enabled light receiving means is not generating an output signal modulated in accordance with said predetermined pattern; and
computer means, responsive to signals from said filter means, for determining if an object is adjacent to said display surface and the location of said object, including means for determining if said filter means is generating at least two blocked path signals corresponding to light paths which intersect each other within the perimeter of said display surface;
including component failure detection means, including means for testing a selected light emitting element, said testing means including means for:
enabling said selected light emitting element and a light receiving element across said display surface from said light emitting element, and testing for the presence of a blocked path signal;
enabling the same light receiving element and a second light emitting element which is located near said selected light emitting element, and testing for the presence of a blocked path signal; and
denoting the detection of a component failure if a blocked path signal is detected when said selected light emitting element is enabled, but no blocked path signal is detected when said second light emitting element is enabled.

2. A touch panel, comprising:
a display surface having a defined perimeter;
a multiplicity of light emitting elements and light receiving elements; said elements located so that the light paths defined by selected pairs of light emitting and light receiving elements cross said display surface and define a grid of intersecting light paths thereon; said light receiving elements including means for generating an output signal corresponding to the amplitude of the light received thereby;
scanning means for sequentially enabling selected pairs of said light emitting and light receiving elements;
modulation means for modulating the amplitude of the light emitted by the currently enabled light emitting element in accordance with a predetermined pattern;
filter means for generating a blocked path signal if the currently enabled light receiving means is not generating an output signal modulated in accordance with said predetermined pattern;
computer means, responsive to signals from said filter means, for determining if an object is adjacent to said display surface and the location of said object, including means for determining if said filter means is generating at least two blocked path signals corresponding to light paths which intersect each other within the perimeter of said display surface;
and component failure detection means for testing the operability of a selected one of said elements by performing the steps of:
enabling said selected element and a complementary element across said display surface from said selected element, and testing for the presence of a blocked path signal;
enabling the same complementary element and a second element of the same type as said selected element and which is located near said selected element, and testing for the presence of a blocked path signal; and
denoting the detection of a component failure if a blocked path signal is detected when said selected element is enabled, but no blocked path signal is detected when said second element is enabled.

3. A touch panel as set forth in claim 2, wherein said component failure detection means includes means for sequentially testing the operability of all of said elements.

4. A touch panel as set forth in claim 3, wherein said component failure detection means includes means for displaying a message on said display surface requesting the user to prevent any objects from touching said display surface.

5. A method of locating the position of an object adjacent to a display surface having a defined perimeter, the steps of the method comprising:
providing a multiplicity of light emitting elements and light receiving elements; said elements located so that the light paths defined by selected pairs of light emitting and light receiving elements cross said display surface and define a grid of intersecting light paths thereon;
sequentially energizing selected pairs of said light emitting and light receiving elements;
modulating the amplitude of the light emitted by the currently enabled light emitting element at a frequency of at least 10 kilohertz in accordance with a predetermined pattern;

generating a blocked path signal if the light received by the currently enabled light receiving means is not modulated in accordance with said predetermined pattern; and generating a location signal when, during a single sequential energization of said elements, at least two blocked path signals are generated corresponding to light paths which intersect each other within the perimeter of said display surface;

further including the step of testing the operability of a selected one of said elements by performing the steps of:

enabling said selected element and a complementary element across said display surface from said selected element, and testing for the presence of a blocked path signal;

enabling the same complementary element and a second element of the same type as said selected element and which is located near said selected element, and testing for the presence of a blocked path signal; and denoting the detection of a component failure if a blocked path signal is detected when said selected element is enabled, but no blocked path signal is detected when said second element is enabled.

6. A method as set forth in claim 5, further including the step of sequentially testing the operability of all of said elements.

7. A method of locating the position of an object adjacent to a display surface having a defined perimeter, the steps of the method comprising:

providing a multiplicity of light emitting elements and light receiving elements; said elements located so that the light paths defined by selected pairs of light emitting and light receiving elements cross said display surface and define a grid of intersecting light paths thereon;

sequentially energizing selected pairs of said light emitting and light receiving elements;

generating a blocked path signal when the currently enabled light receiving means does not receive the light emitted from the currently enabled light emitting means; and testing the operability of a selected one of said elements by performing the steps of:

enabling said selected element and a complementary element across said display surface from said selected element, and testing for the presence of a blocked path signal;

enabling the same complementary element and a second element of the same type as said selected element and which is located near said selected element, and testing for the presence of a blocked path signal; and denoting the detection of a component failure if a blocked path signal is detected when said selected element is enabled, but no blocked path signal is detected when said second element is enabled.

8. A method as set forth in claim 7, further including the step of sequentially testing the operability of all of said elements.

9. A touch panel, comprising:

a display surface having a defined perimeter;

a multiplicity of light emitting elements and light receiving elements; said elements located so that the light paths defined by selected pairs of light emitting and light receiving elements cross said display surface and define a grid of intersecting light paths thereon; said light receiving elements including means for generating an output signal corresponding to the amplitude of the light received thereby;

scanning means for sequentially enabling selected pairs of said light emitting and light receiving elements;

blockage detection means for generating a blocked path signal when the currently enabled light receiving means does not receive the light emitted from the currently enabled light emitting means; and component failure detection means, including testing means coupled to said blockage detection means for testing a selected light emitting element, said testing means including means for:

enabling said selected light emitting element and a light receiving element across said display surface from said light emitting element, and testing for the presence of a blocked path signal;

enabling the same light receiving element and a second light emitting element which is located near said selected light emitting element, and testing for the presence of a blocked path signal; and denoting the detection of a component failure if a blocked path signal is detected when said selected light emitting element is enabled, but no blocked path signal is detected when said second light emitting element is enabled.

* * * * *